United States Patent [19]

Dion

[11] Patent Number: 4,578,579

[45] Date of Patent: Mar. 25, 1986

[54] METHOD FOR DEPTH REFERENCING HYDROCARBON GAS SHOWS ON MUD LOGS

[75] Inventor: Eric P. Dion, Dallas, Tex.

[73] Assignee: Mobil Oil Corporation, New York, N.Y.

[21] Appl. No.: 528,503

[22] Filed: Sep. 1, 1983

[51] Int. Cl.[4] .......................... G01V 11/00; G01V 5/06
[52] U.S. Cl. ..................................... 250/256; 250/254; 250/255; 250/253
[58] Field of Search ............... 250/253, 254, 255, 256; 175/40, 41, 50; 73/153

[56] References Cited

U.S. PATENT DOCUMENTS 2,528,955  11/1950  Hayward ........................... 175/41
2,883,856  4/1959  Youngman ........................... 73/23
3,940,610  2/1976  Dennis et al. ...................... 250/253

FOREIGN PATENT DOCUMENTS 898372  1/1982  U.S.S.R. ............................ 250/253

Primary Examiner—Alfred E. Smith
Assistant Examiner—Constantine Hannaher
Attorney, Agent, or Firm—A. J. McKillop; Michael G. Gilman; George W. Hager, Jr.

[57] ABSTRACT

A hydrocarbon mud log and a natural gamma-ray mud log are recorded for well drilling operations. A natural gamma-ray wireline log is run in the well following drilling operations. The natural gamma-ray mud log and natural gamma-ray wireline log are correlated to identify the correct depth interval of gas shows on the hydrocarbon mud log.

7 Claims, 6 Drawing Figures

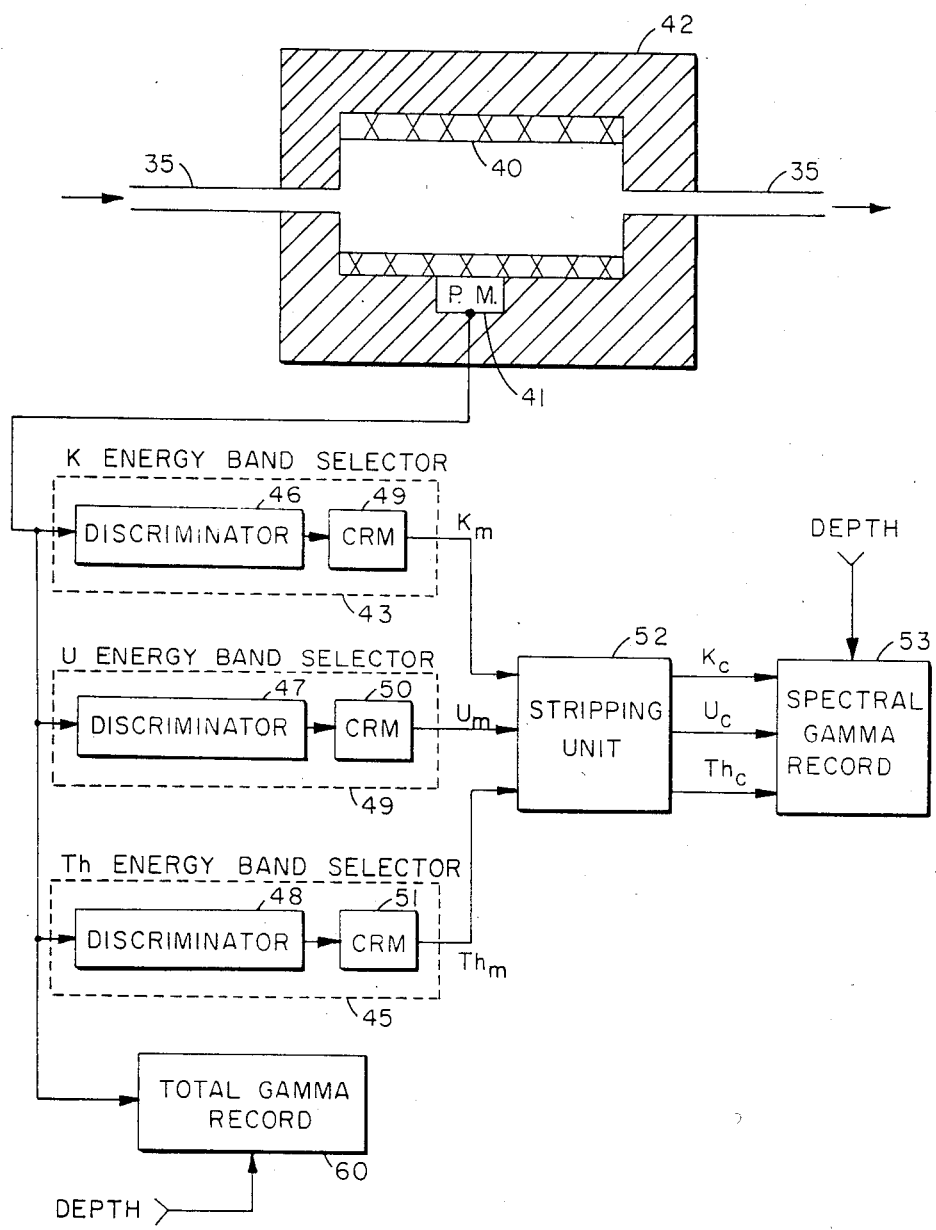

METHOD FOR DEPTH REFERENCING HYDROCARBON GAS SHOWS ON MUD LOGS

BACKGROUND OF THE INVENTION

This invention relates to wells drilled in the earth and more particularly to identifying subsurface formations penetrated by such wells which are hydrocarbon bearing.

In the drilling of wells into the earth by rotary drilling techniques, a drill bit is attached to a drill string, lowered into the well, and rotated in contact with the earth, thereby breaking and fracturing the earth and forming a wellbore. A drilling mud is circulated down the drill string and through ports provided in the drill bit to the bottom of the well and then upward through the annular space formed between the drill string and the wall of the well. The drilling mud serves several purposes including cooling the drill bit, removing formation cuttings from the well, and supplying hydrostatic pressure upon the formations penetrated by the well to prevent fluids existing therein under pressure from flowing into the well.

Customarily during the drilling of the well a mud log is made. This log is made by analyzing the drill mud for the presence of hydrocarbon gas in the entrained formation cuttings removed from the wellbore from subterranean hydrocarbon bearing formations. The location of the drill bit is correlated with the mud analysis to provide a depth reference to the mud log.

Such a mud log provides important depth information for use in completing the well for the production of oil and gas, especially in the perforation of the well after casing. More particularly, a string of casing is often run into the well and cement is poured into the annulus between the casing string and the wall of the well to form a cement sheath for bonding the casing to the well. A perforating means is then lowered into the well adjacent the subterranean formation to be produced and activated to perforate the casing and cement sheath to provide fluid communication tunnels between the interior of the well and the subterranean formation to be produced. The mud log aids in the positioning of the perforating means in the well by identifying the depth in the well at which formation cuttings having entrapped hydrocarbon gas were obtained.

SUMMARY OF THE INVENTION

The present invention is directed to a method for depth referencing the presence of hydrocarbon gas shows on a hydrocarbon mud log recorded from well drilling operations in which a drilling mud is continually circulated past a drill bit to carry formation cuttings upward to the earth's surface. A natural gamma ray mud log is run along with the hydrocarbon mud log. Subsequent to the well drilling operations, a natural gamma-ray wireline log is run in the borehole. The natural gamma-ray mud log and the natural gamma-ray wireline log are correlated. Gas shows recorded on the hydrocarbon mud log are correctly identified with respect to depth when there is good correlation between such gamma-ray logs over the depth interval of the recorded gas show.

BRIEF DESCRIPTION OF THE DRAWINGS

FIG. 4 illustrates a system for measuring the natural gamma radiation in the drilling mud flow of the well drilling system of FIG. 1.

DESCRIPTION OF THE PREFERRED EMBODIMENT

Figure 1:
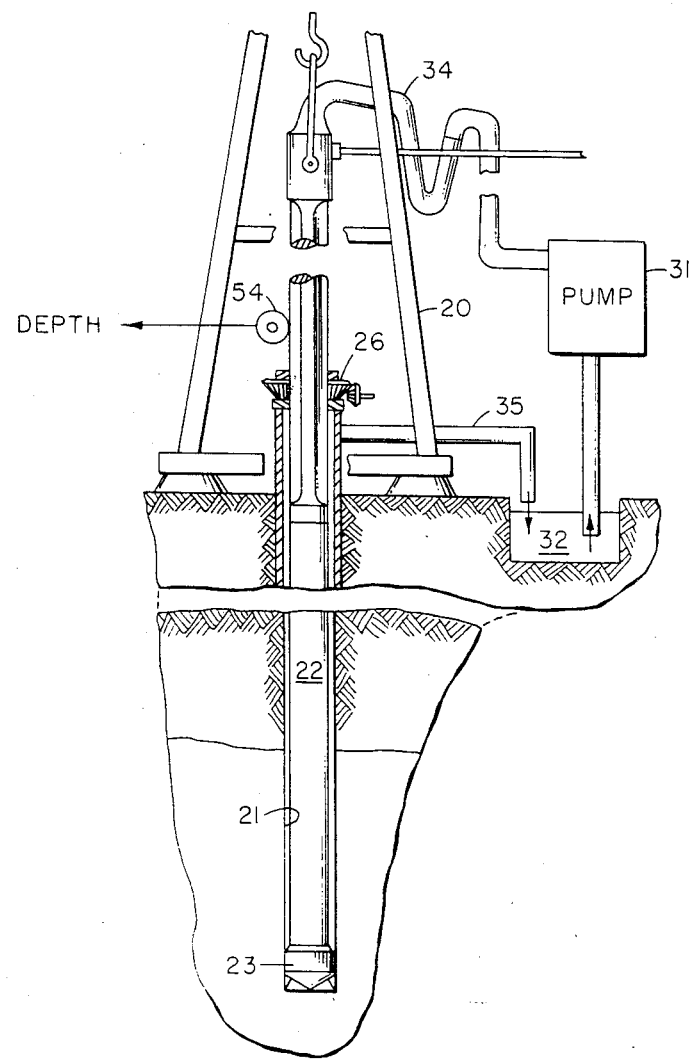
FIG. 1 illustrates a well drilling system with which the present invention may be utilized.

In accordance with the present invention both a hydrocarbon mud log and a natural gamma-ray mud log are continuously made during well drilling operations. Referring to FIG. 1, a derrick 20 is located over a well 21 being drilled in the earth by rotary drilling. A drill collar 22 is suspended within the well 21 and includes a drill bit 23 secured at its lower end. A suitable prime mover (not shown) drives a member 26 to rotate the drill string 22.

A pump 32 transfers drilling mud from a pit 32 in the earth into the drill collar 22. The drilling fluid then flows downward into the drill collar 22 and exits through openings in the drill bit 23 into the well 21. The drilling fluid then circulates upward from the drill bit 23, carrying formation cuttings through the annulus between the drill collar 22 and the well 21 to the surface of the earth. A pipe 35 returns the drilling mud from the well 21 to the pit 32. This flow of drilling mud through pipe 35 is continuously monitored for the presence of hydrocarbons and natural gamma radiation activity in the entrained drill cuttings.

Figure 2:
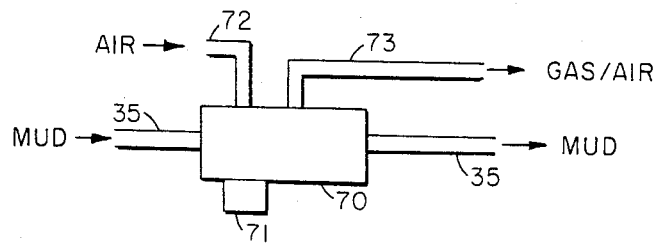
FIGS. 2 and 3 illustrate a system for detecting the presence of hydrocarbon gases in the drilling mud flow of the well drilling system of FIG. 1.
Figure 3:
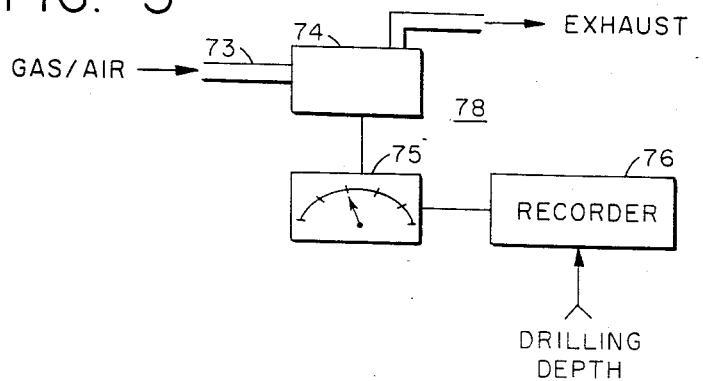

The detection of hydrocarbons is conventionally carried out by a commercial logging service introduced in 1939 and known as "mud logging". Although several sophisticated detection techniques have been proposed, most mud logging services rely upon the catalytic combustion of gas. Hydrocarbon gas is shown in FIG. 2 as being extracted from the formation cuttings in real time during drilling operations. The mud flow in pipe 35 passes through extraction chamber 70 which includes an agitator 71. Hydrocarbon gas entrapped in the formation cuttings is extracted by agitation in the enclosed chamber of extractor 70 into which a constant volume of air is drawn through pipe 72. The gas-air mixture is drawn from the top of the chamber and carried by pipe 73 to the gas detector unit 78 of FIG. 3. For a constant mud flow rate and a constant air supply, the gas-air ratio varies with the volume of gas present in a unit mud volume. The gas/air mixture is drawn through the "hot wire" combustion chamber 74. Catalytic combustion of hydrocarbon gases within chamber 74 heats a filament, causing the filament's electrical resistance to increase. The change is resistance unbalances a bridge circuit, causing an electric current to flow in proportion to the resistance change, and hence in proportion to gas concentration. This current flow is detected by the current meter 75 and is used to drive the mud log recorder 76 which is correlated with drilling depth as indicated by the measuring sheave 54 of FIG. 1. In this manner a hydrocarbon mud log is recorded which indicates the presence of hydrocarbon gas in the formation cuttings correlated with the drilling depth in the borehole.

In an alternate embodiment the drilling mud may be sampled over discrete time intervals during the drilling operation and the formation cuttings in such samples later tested for hydrocarbon gas content and natural gamma radiation.

Several commercial mud logging services are available, one such service being supplied by Schlumberger Well Services, Houston, Tex.

Concurrently with the production of the hydrocarbon mud log on recorder 76, the drilling mud through pipe 35 is also continuously monitored for any natural gamma-ray activity from the entrained formation cuttings as shown in FIG. 4 by one or more gamma-ray detectors 40. Preferably detector or detectors 40 includes a scintillation type detector (e.g., a crystal of sodium iodide activated with thallium) which cooperates with one or more photomultiplier tubes 41 to detect the natural gamma-ray activity. Suitable shielding 42 of lead or other dense material surrounds detector or detectors 40 to reduce background radiation from sources other than the entrained formation cuttings in the drilling mud flow through pipe 35.

The thallium-activated sodium iodide of detector or detectors 40 gives off quanta of light energy called photons, the intensity of which is proportional to the energy of the gamma-ray interaction in the sodium iodide crystal. The photomultiplier tube 41 responds to these photons to produce a succession of pulses having magnitudes proportional to the energy of the gamma-rays. These pulses are discriminated into three separate energy bands by the energy band selectors 43-45. Selector 43 includes a discriminator 46 which passes a band of energy centered about 1.46 MEV, the energy level at which potassium exhibits peak intensity. Selector 44 includes a discriminator 47 which passes a band of energy centered about 1.76 MEV, at which energy level uranium exhibits peak intensity. Similarly, selector 45 includes a discriminator 48 which passes a band of energy centered about 2.62 MEV, the energy level at which thorium exhibits peak intensity. The pulses within each of these separate energy bands are applied to separate count rate meters 49-51 which provide outputs $K_m$, $U_m$ and $Th_m$ having magnitudes indicative of the number of photons within each of the respective energy bands. Stripping unit 52 comprises three analyzer channels, a potassium channel, a uranium channel, and a thorium channel. The potassium channel strips the measured potassium output $K_m$ of any overlapping count rate contribution from the uranium and thorium lower energy bands. The uranium channel strips the measured uranium output $U_m$ of any overlapping count rate contribution from the thorium lower energy band. The measured thorium output $Th_m$ needs no stripping. The outputs $K_c$, $U_c$ and $Th_c$ from the stripping unit 52 represent the correct potassium, uranium and thorium natural gamma-ray activities respectively of the entrained formation cuttings in the mud flow in pipe 35. For a more detailed description of the potassium, uranium and thorium energy band selectors 43-45 and of the stripping unit 52 reference may be made to U.S. Pat. No. 3,940,610 to Dennis et al.

These outputs $K_c$, $U_c$ and $Th_c$ are applied to recorder 53 simultaneously with the depth of the drilling operation within the borehole and indicated by rotation of the measuring sheave 54 of FIG. 1 in response to the lowering of the drill string 22 or, in the alternative, may even be derived from rotation of the drive member 26. In this manner the natural gamma radiation measurement of the formation cuttings is continuously correlated with the depth of drilling so as to produce a gamma-ray mud log of the natural gamma radiation of the subsurface formations surrounding the borehole.

In an alternative operation the pulses from the photomultiplier tube or tubes 41 may be recorded directly onto a recorder 60 along with the depth information to provide a gamma-ray mud log of the total gamma-ray activity of the subsurface formations surrounding the borehole.

Figure 5:
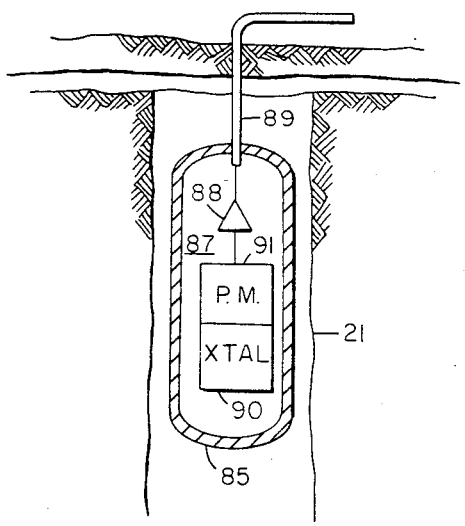
FIG. 5 illustrates a borehole logging tool for measuring natural gamma radiation in a well.

Upon completion of the well drilling operations, the well 21 is generally completed and perforated adjacent to these subsurface formations expected of containing hydrocarbons. Prior to perforating, a conventional gamma-ray wireline log is run through the well 21 by a borehole logging tool as shown in FIG. 5. The logging tool 85 includes a gamma-ray detector 87 and an amplifier 88. The gamma-ray detector 87 preferably includes a scintillation type detector 90 (e.g. a crystal of sodium iodide activated with thallium) which cooperates with a photomultiplier tube 91 to detect natural gamma radiation. The photomultiplier tube 91 produces pulses having magnitudes proportional to the detected gamma radiation. These pulses are sent uphole by way of the amplifier 88 and the wireline logging cable 89. The natural gamma radiation represented by these pulses are recorded utilizing the same or similar circuitry to that shown in FIG. 4 and in the aforementioned U.S. Pat. No. 3,940,610 to Dennis et al. For example, the total natural gamma radiation measured during the wireline logging operation may be recorded on a recorder such as shown at 60 in FIG. 4. In the alternative, such natural gamma radiation may be separated into potassium, uranium and thorium energy bands and then recorded such as shown at 43-45, 52 and 53 in FIG. 4 to produce a spectral gamma radiation log.

It is a specific aspect of the present invention to use the hydrocarbon mud log, the gamma-ray mud log and the gamma-ray wireline log to identify subsurface formations surrounding the drilled well suspected of containing hydrocarbons and adjacent which the completed well is to be perforated for production of hydrocarbons. The difficulty with using the hydrocarbon mud log alone is that the depth of an identified hydrocarbon show is not always accurate. For example, a piece of the formation along the borehole wall above the drilling level could break off and be carried uphole by the drilling mud. If this piece of formation contained hydrocarbon gas, an inaccurate indication of the presence of hydrocarbon gas at the drilling level would be recorded on the hydrocarbon mud log. To verify the accuracy or inaccuracy of a hydrocarbon show on the mud log the two gamma-ray logs are run and correlated. More particularly, the gamma-ray mud log is run simultaneously with the hydrocarbon mud log, so as to reflect the same depth indications as may be present on the hydrocarbon mud log. These depth indications can then be examined for accuracy by correlating the gamma-ray mud log with the gamma ray wireline log run after completion of the well.

Figure 6:
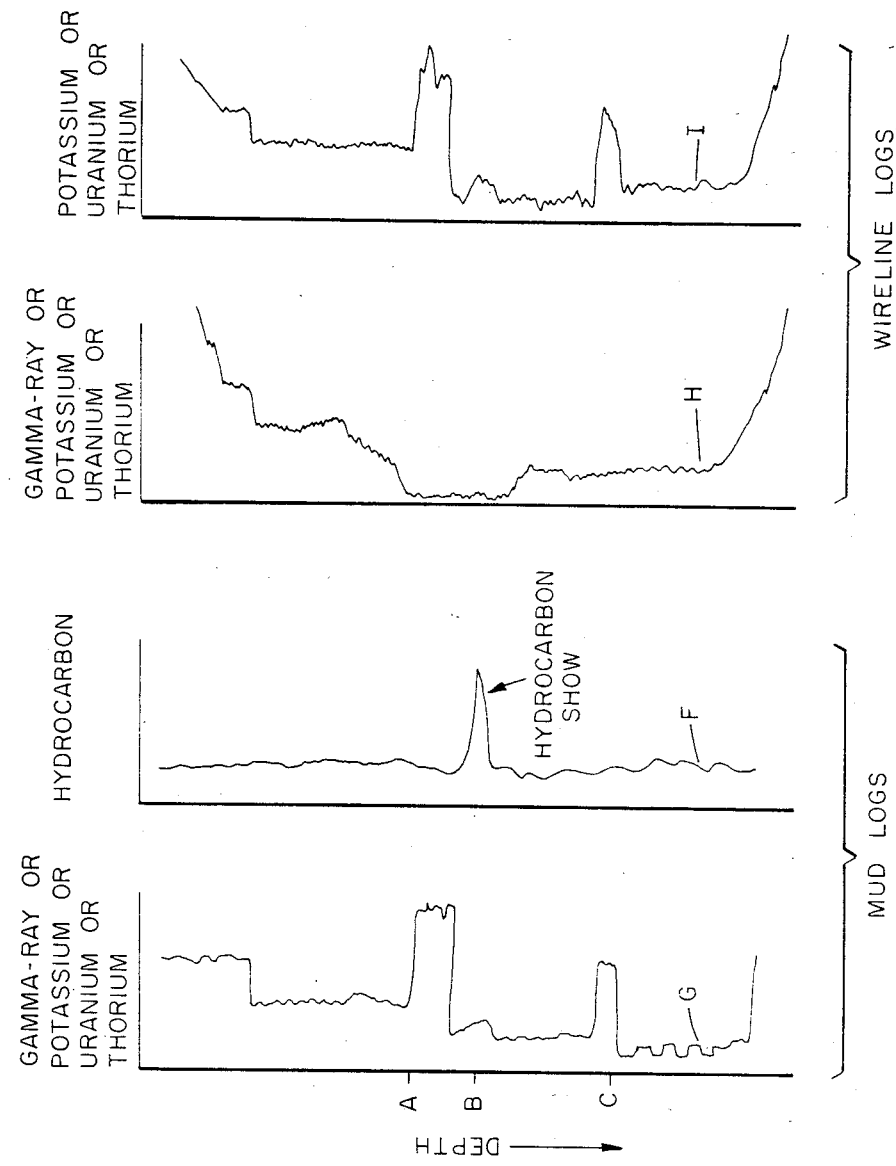
FIG. 6 illustrates mud logs and wireline logs obtained by the systems of FIGS. 2-5.

Such a correlation for identifying a hydrocarbon show on the mud log can be seen in FIG. 6. A hydrocarbon mud log curve F reflects a hydrocarbon show at depth B in the well. The gamma-ray mud log curve G shows natural gamma radiation peaks at depths A and C. If a gamma-ray wireline log curve H were recorded, the hydrocarbon show at depth B would be inaccurate since there is no natural gamma radiation correlation at or near depth B between curves G and H. However, if a gamma-ray wireline log curve I were recorded instead of H, the hydrocarbon show at depth B would be accurate due to the good correlation between curves G and I at or near depth B.

Accordingly, with a good correlation between the two gamma-ray logs, the formation could be perforated adjacent to those formations showing hydrocarbon shows on the mud log. However, with no correlation between the two gamma ray logs, the perforating operation would not be carried out.

Having now described the depth referencing method of the present invention in connection with a preferred embodiment, it is to be understood that various modifications and changes can be made without departing from the spirit and scope of the invention as set forth in the appended claims.

I claim:

1. A method for identifying hydrocarbon formations surrounding a borehole, comprising the steps of:
   a. measuring hydrocarbon gas in the entrained formation cuttings obtained during drilling operations in which a drilling mud is continually circulated past a drill bit to carry said cuttings to the earth's surface,
   b. simultaneously measuring natural gamma radiation in said cuttings,
   c. identifying the depths at which said cuttings were obtained within the borehole,
   d. measuring natural gamma radiation within the borehole following completion of said drilling operations,
   e. correlating said natural gamma radiation measurements in steps (b) and (d), and
   f. identifying the depths within the borehole from which the entrained cuttings containing hydrocarbon gas were obtained during drilling operations when there is correlation between said natural gamma radiation measurements in steps (b) and (d).

2. A method for identifying hydrocarbon bearing formations surrounding a borehole, comprising the steps of:
   a. generating a hydrocarbon mud log from entrained formation cuttings obtained during the drilling of said borehole in which a drilling mud is continually circulated past a drill bit to carry said cuttings to the earth's surface,
   b. simultaneously generating a natural gamma-ray mud log from said entrained formation cuttings,
   c. generating a natural gamma-ray wireline log of the formations surrounding said borehole subsequent to the drilling of said borehole,
   d. correlating said natural gamma-ray mud log and said natural gamma-ray wireline log,
   e. utilizing gas shows on said hydrocarbon mud log to identify the presence of hydrocarbon-bearing formations surrounding said borehole when there is correlation of gamma-ray activity between said natural gamma-ray mud log and said natural gamma-ray wireline log over the depth interval of said gas shows.

3. The method of claim 2 wherein both said natural gamma-ray mud log and said natural gamma-ray wireline log are spectral logs.

4. The method of claim 2 wherein said hydrocarbon mud log and said natural gamma-ray mud log are generated from gamma radiation measurements taken in real time during the drilling of said borehole.

5. The method of claim 4 wherein said gamma radiation measurements are plotted against the real time depth at which drilling is taking place.

6. The method of claim 2 wherein samples of said entrained formation cuttings are collected over discrete time intervals from the drilling mud during the drilling of said borehole and said hydrocarbon mud log and said natural gamma-ray mud log generated from collected gamma radiation measurements taken on said collected samples.

7. The method of claim 6 wherein the gamma radiation measurements are plotted against the depth intervals over which said collected samples were taken during drilling operations.

* * * * *